(12) United States Patent
Maiman et al.

(10) Patent No.: US 12,182,647 B2
(45) Date of Patent: *Dec. 31, 2024

(54) TRANSACTION CARD WITH LIGHTWEIGHT CORE

(71) Applicant: Capital One Services, LLC, McLean, VA (US)

(72) Inventors: Tyler Maiman, Melville, NY (US); Asher Smith-Rose, Raleigh, NC (US); Bryant Yee, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,046

(22) Filed: May 31, 2023

(65) Prior Publication Data

US 2023/0316033 A1 Oct. 5, 2023

Related U.S. Application Data

(63) Continuation of application No. 17/473,136, filed on Sep. 13, 2021, now Pat. No. 11,699,059.

(51) Int. Cl.
| | | |
|---|---|---|
| *G06K 19/02* | (2006.01) | |
| *G06K 19/06* | (2006.01) | |
| *G06K 19/077* | (2006.01) | |

(52) U.S. Cl.
CPC . *G06K 19/07722* (2013.01); *G06K 19/06187* (2013.01); *G06K 19/07745* (2013.01)

(58) Field of Classification Search
CPC ....... G06K 19/06187; G06K 19/07745; G06Q 20/341
USPC .......................................... 235/488, 487, 492
See application file for complete search history.

(56) References Cited

U.S. PATENT DOCUMENTS

| | | | |
|---|---|---|---|
| 11,373,169 B2 * | 6/2022 | Rule | G06Q 20/352 |
| 2007/0207287 A1 * | 9/2007 | Kwok | B32B 7/03 |
| | | | 428/114 |

FOREIGN PATENT DOCUMENTS

| | | | | |
|---|---|---|---|---|
| CN | 1956888 | * | 1/2005 | B65B 61/06 |
| CN | 108604587 | * | 8/2008 | H01L 29/2003 |
| GB | 2428628 | * | 2/2007 | B32B 5/16 |
| JP | 2002319812 | * | 10/2002 | H01Q 1/38 |

* cited by examiner

*Primary Examiner* — Daniel St Cyr
(74) *Attorney, Agent, or Firm* — KDW Firm PLLC

(57) ABSTRACT

Provided are transaction cards with a reduced weight core. In some approaches, a transaction card may include a body having a first outer layer opposite a second outer layer, and a corrugated core between the first outer layer and the second outer layer, wherein the corrugated core comprises a plurality of alternating peaks and valleys coupled to the first outer layer and the second outer layer. The transaction card may further include an identification chip positioned through the first outer layer, wherein the identification chip is directly coupled to the corrugated core.

20 Claims, 3 Drawing Sheets

TRANSACTION CARD WITH LIGHTWEIGHT CORE

CROSS-REFERENCE TO RELATED APPLICATIONS

This application is a continuation of U.S. patent application Ser. No. 17/473,136, entitled "TRANSACTION CARD WITH LIGHTWEIGHT CORE" filed Sep. 13, 2021. The contents of the aforementioned application are incorporated herein by reference in their entirety.

FIELD

Embodiments of the present disclosure relate to transaction cards and, more particularly, to transaction cards with a light lightweight core.

BACKGROUND

Transaction cards, such as credit and debit cards, have become a primary means for individuals to complete transactions involving data exchange. Many other forms of cards are also widely used, such as identification cards, loyalty cards, prescription cards, insurance cards, etc. These forms of transaction cards are typically formed of a thin and substantially flat plastic or metal substrate that can easily be swiped through a card reader, stored in a wallet or purse, or the like. Metal transaction cards tend be heavier, which leads to increased shipping costs and less comfort for the card user.

In some instances, it may be desirable to reduce the weight of transaction cards. It is with respect to this and other considerations that the present disclosure is provided.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body comprising a first outer layer opposite a second outer layer, and a corrugated core between the first outer layer and the second outer layer, wherein the corrugated core comprises a plurality of alternating peaks and valleys coupled to the first outer layer and the second outer layer. The transaction card may further include an identification chip positioned through the first outer layer, wherein the identification chip is directly coupled to the corrugated core.

In another approach according to the disclosure, a contactless transaction card may include a body comprising a first outer layer opposite a second outer layer, and a corrugated core between the first outer layer and the second outer layer, wherein the corrugated core comprises a plurality of alternating peaks and valleys, wherein two or more peaks of the plurality of alternating peaks and valleys are coupled to the first outer layer, and wherein two or more valleys of the plurality of alternating peaks and valleys are coupled to the second outer layer. The contactless card may further include an identification chip positioned through the first outer layer, wherein the identification chip is directly coupled to the corrugated core.

In yet another approach according to the disclosure, a transaction card may include a body comprising a first outer layer opposite a second outer layer, and a corrugated core between the first outer layer and the second outer layer, wherein the corrugated core comprises a plurality of alternating peaks and valleys, wherein two or more peaks of the plurality of alternating peaks and valleys are coupled to the first outer layer, and wherein two or more valleys of the plurality of alternating peaks and valleys are coupled to the second outer layer. The transaction card may further include an identification chip positioned through the first outer layer, wherein the identification chip is directly coupled to the corrugated core by an adhesive.

BRIEF DESCRIPTION OF THE DRAWINGS

The accompanying drawings illustrate example approaches of the disclosure, including the practical application of the principles thereof, as follows.

Figure 1:
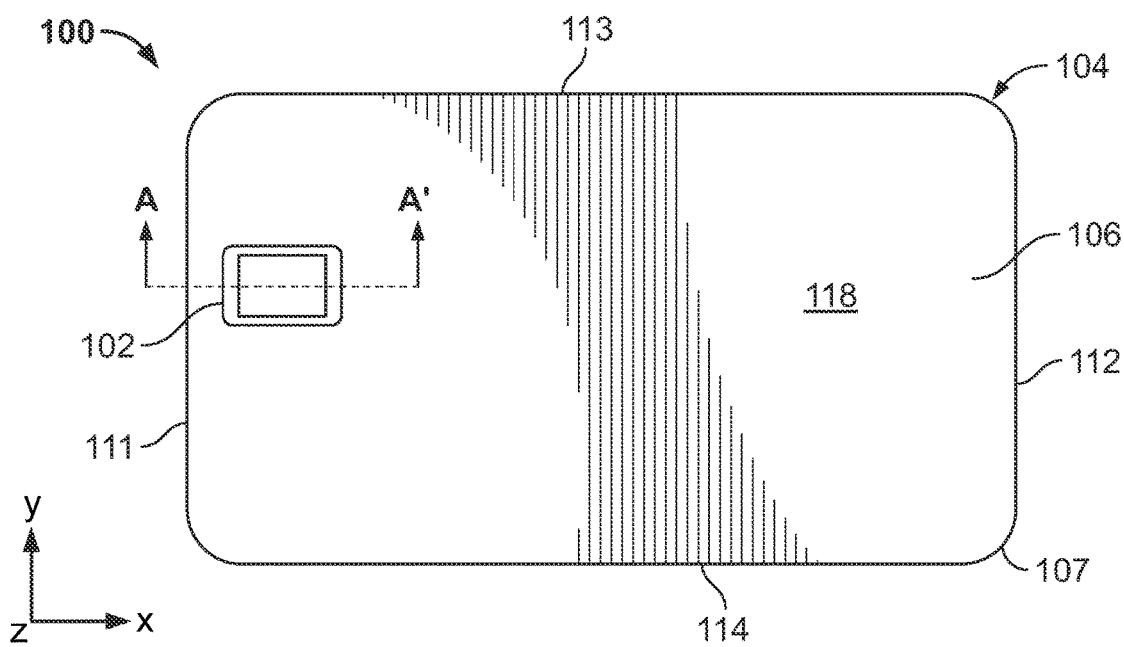
FIG. 1 is a top/front view of a transaction card, in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to transaction cards having a lightweight core to reduce the overall weight of the card. In some embodiments, the lightweight core may be a corrugated core extending or sandwiched between front and back layers of the card. The corrugated core results in less material and therefore less weight, while also increasing the strength and rigidity of the card. Furthermore, the corrugated core may decrease cost while maintaining structural integrity and aesthetics of the card. In some embodiments, an identification (ID) chip may be secured to the corrugated core, thus increasing adhesion.

Figure 2:
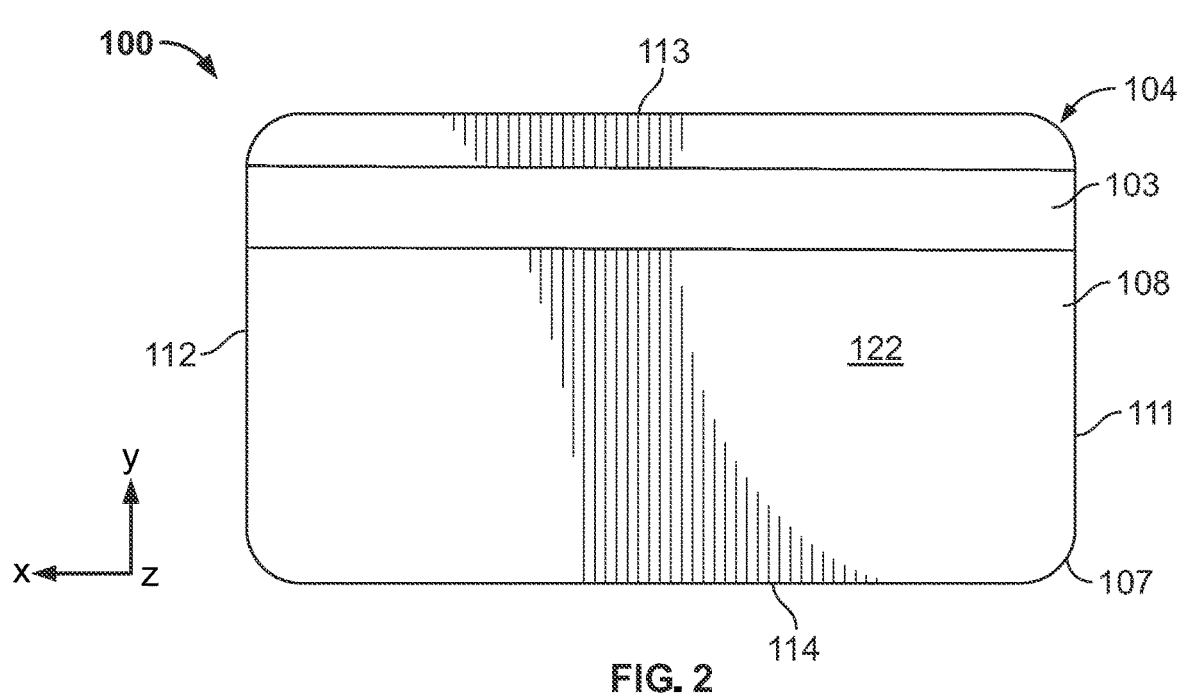
FIG. 2 is a bottom/back view of the transaction card of FIG. 1A, in accordance with embodiments of the present disclosure.
Figure 3:
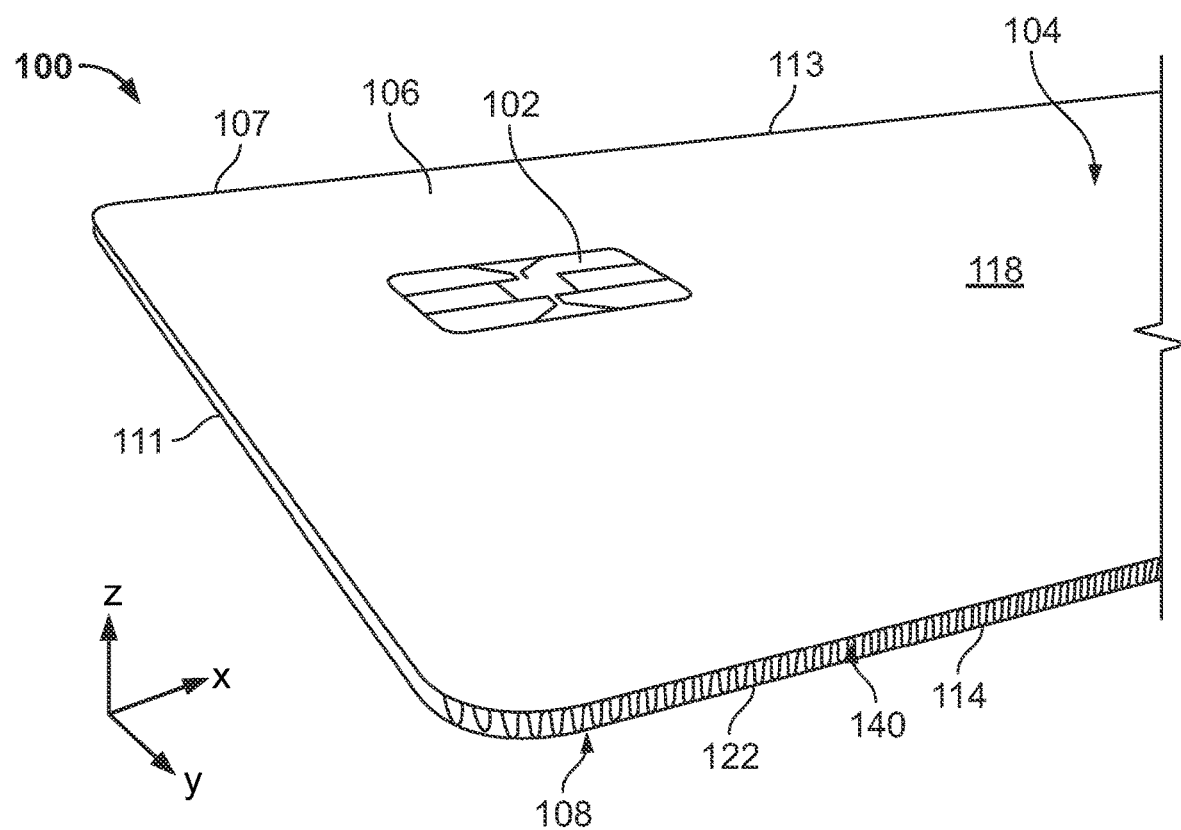
FIG. 3 is a perspective view of the transaction card of FIGS. 1-2, in accordance with embodiments of the present disclosure.

Referring now to FIGS. 1-3, an example transaction card (hereinafter "card") 100 according to embodiments of the disclosure will be described. Transaction cards include, but are not limited to, credit cards, debit cards, gift cards, rewards cards, frequent flyer cards, merchant-specific cards, rewards cards, travel cards (e.g., a train pass, a bus pass, etc.), discount cards, insurance cards, identification cards, and driver's licenses. Described sometimes herein as contactless due to the method of communication by an identification chip 102, such as an EMV chip, the card 100 may also provide one or more functions requiring contact. For example, the card 100 may include a magnetic stripe 103 and/or a microchip connected to contacts present on an outer (e.g., back) layer of the card 100.

As shown, a body 104 of the card 100 may include a first main side 106 opposite a second main side 108. Although non-limiting, the first main side 106 may correspond to a front or top side of the card 100, while the second main side 108 may correspond to a back or bottom side of the card 100. The body 104 may be defined by an outer perimeter 107 including a first side 113 opposite a second side 114 and a first end 111 opposite a second end 112. As shown, a first dimension (e.g., length, along x-direction) extending between the first and second ends 111, 112 is greater than a second dimension (e.g., height, along y-direction) extending between the first and second sides 113, 114.

In some embodiments, the magnetic stripe 103 may be provided on the second main side 108 of the body 104, wherein the magnetic stripe 103 is part of a second outer layer 122. In other embodiments, the magnetic stripe 103 is part of a separate component or layer disposed atop or beneath the second outer layer 122. The magnetic stripe 103 may contain cardholder data in accordance with standard protocols. For example, in some embodiments, the magnetic stripe 103 includes three tracks, often designated as track 1, track 2, and track 3. Many payment cards, such as credit cards or debit cards, have a magnetic stripe that includes two tracks, such as a magnetic stripe that includes tracks 1 and 2. Many card readers can read a magnetic stripe that includes three tracks, and in cases where the payment card includes a magnetic stripe with only two tracks, the card reader's ability to read a third track is unused. In non-limiting embodiments, when the magnetic stripe 103 is encoded with account data of the card 100 using two tracks, the account data of the card 100 can be encoded in tracks 1 and 2. Track 3 of the magnetic stripe 103 may be unused and devoid of valid data in such a situation. Embodiments herein are not limited in this context.

Although not shown, the second main side 108 of the card 100 may include additional identifying indicia. For example, additional identifying indicia may include a card verification value (CVV), such as a 3-digit number. Depending on the type of card, the additional identifying indicia may be present on or near a signature strip. The first main side 106 of the card 100 may include a first outer layer 118 containing identifying indicia, such as an account holder name and/or a card number. Although non-limiting, the card number may be a 16-digit number (e.g., four groups of four digits). In other embodiments, the card number may include a different number of digits. The identifying indicia may be printed over/on the first outer layer 118. However, one skilled in the art will appreciate that the printing of the identifying indicia, along with any other indicia, logos, etc., may be applied to any surface or layer of the card 100. Moreover, any suitable printing, scoring, imprinting, marking or like method is within the scope of the present disclosure.

As further shown, the identification chip 102 may be coupled (e.g., recessed or partially embedded) to the first main side 106 of the card 100. As used herein, the identification chip 102 may be any microprocessor device configured to exchange data electromagnetically, such as an EMV or RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies.

The card 100 may be made from one or more thermoplastics including, but not limited to, polyvinyl chloride (PVC), polyester, polypropylene, polyethylene, or polycarbonate. Various other materials may also be used, including, but not limited to, soft touch plastic, metal (e.g., aluminum), fiber composite materials, resin, etc. In some embodiments, the card 100 may include additional material features, such as coverings (e.g., a silicone overmold), veneers (e.g., a wooden veneer), finishes (e.g. an oil-slick aluminum finish), or the like. In embodiments where a body 104 of the card 100 is formed of multiple layers or card substrates, each card substrate may be formed of the same material. Alternatively, one or more card substrates may be formed of a different material. For example, the second (e.g., back) outer layer 122 may be formed of a plastic, such as polycarbonate (PC), whereas the first (e.g., front) outer layer 118 may be formed of a separate material, such as aluminum.

As best shown in FIG. 3, the card 100 may further include a corrugated core 140 sandwiched between the first outer layer 118 and the second outer layer 122. The corrugated core 140 may be made from a same or different material than the first outer layer 118 and/or the second outer layer 122. For example, the first and second outer layers 118, 122 may be made from metal, while the corrugated core 140 may be made from a plastic polymer. In other embodiments, the corrugated core 140 may be made from a metal. The corrugated core 140 may extend entirely between the first and second ends 111, 112 and/or entirely between the first and second sides 113, 114. Said differently, the corrugated core 140 may extend to the outer perimeter 107 of the body 104. In other embodiments, the corrugated core 140 may extend only partially between the first and second sides 113, 114 and/or partially between the first and second ends 111, 112. The corrugated core 140 may be open or covered anywhere along the outer perimeter 107. Furthermore, the corrugated core 140 may be made from a transparent, translucent, or opaque material. Embodiments herein are not limited in this context.

Although not limited to any manufacturing method, the first and second outer layers 118, 122 and the corrugated core 140 may be formed separately and then joined together, e.g., using an adhesive. In other approaches, the first and second outer layers 118, 122 and the corrugated core 140 may be formed together using 3-D printing or injection molding processes.

Figure 4:
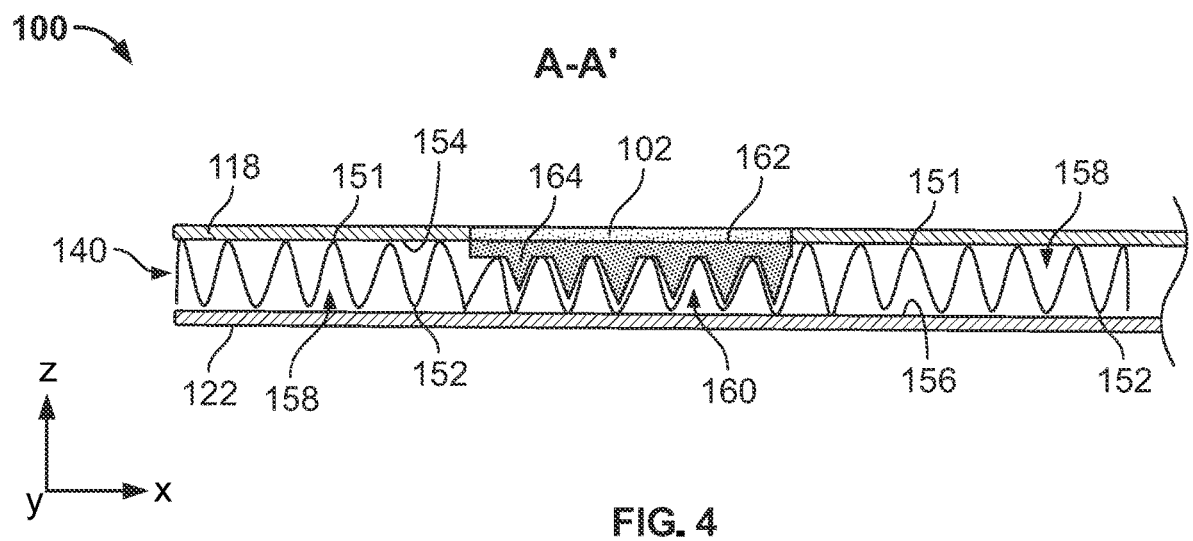
FIG. 4 is a cross-sectional view of the transaction card, along cutline A-A' of FIG. 1, in accordance with embodiments of the present disclosure.

Turning to FIG. 4, the corrugated core 140 according to embodiments of the present disclosure will be described in greater detail. As shown, the corrugated core 140 may include a series of protrusions or ridges, such as peaks/crests 151 and valleys/troughs 152, coupled to the first outer layer 118 and the second outer layer 122. The peaks 151 and valleys 152 may be arranged in a fluted or wave configuration. In some embodiments, the peaks 151 may be directly connected with an inner surface 154 of the first outer layer 118, while the valleys 152 may be directly connected with an inner surface 156 of the second outer layer 122. Air gaps or spaces 158 between the peaks 151 and the valleys 152 may generally be open to reduce the weight of the corrugated core 140. In some embodiments, the corrugated core 140 may include multiple layers positioned or stacked (e.g., in the z-direction) between the first and second outer layers 118, 122. For example, two sheets of fluted corrugated material may be coupled between the first and second outer layers 118, 122.

As further shown, a subsection 160 of the corrugated core 140 may be secured to an underside 162 of the identification chip 102, e.g., by an adhesive 164. The adhesive 164, or multiple adhesives, may be applied to the peaks 151 and located within the spaces 158 of the corrugated core 140 to strengthen adhesion between the identification chip 102 and the corrugated core 140. Unlike identification chips that are applied to a flat surface, removal of the identification chip 102 may be made more difficult and chip fraud may thus be reduced using the corrugated core 140 of the present disclosure.

In various examples, each of the one or more peaks 151 and one or more valleys 152 of the corrugated core 140 may comprise same or different shapes, lengths, and/or dimensions so as to produce one or more arrangements of wave shapes or ridges. Furthermore, a fewer or greater number of peaks and valleys may be included, and other types of peaks 151 and valleys 152 may comprise one or more angled and/or curved portions. Accordingly, one or more peaks 151 and one or more valleys 152 may comprise different or irregular shapes, lengths, and/or dimensions. In some examples, one or more subsets of the one or more peaks 151 and the one or more valleys 152 may be generated or repeated after a predetermined interval, or one or more subsets of the one or more peaks 151 and one or more valleys 152 may be generated or repeated at random, as determined by one or more machining processes. For example, a width (pitch) between one or more peaks 151 and/or one or more valleys 152 may vary across the body 104. In some embodiments, the subsection 160 of the corrugated core 140 beneath the identification chip 102 may have a first pitch, while the remainder of the corrugated core 140 may have a second (e.g., different) pitch. In yet other embodiments, just an area of the corrugated core 140 adjacent/beneath the identification chip 102 may have a different pitch than the subsection 160.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The term "adhesive" used herein may refer to any type of substance used for sticking objects or materials together and may be classified in a variety of ways depending on their chemistries (e.g., epoxies, polyurethanes, polyimides), their form (e.g., paste, liquid, film, pellets, tape), their type (e.g., hot melt, reactive hot melt, thermosetting, pressure sensitive, contact, etc.), or their load carrying capability (structural, semi-structural, or non-structural).

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary. Although non-limiting, the card 100 and the card 200 described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
a body comprising a first outer layer opposite a second outer layer; and
a corrugated core between the first outer layer and the second outer layer, wherein the corrugated core comprises a plurality of alternating peaks and valleys directly coupled to the first outer layer and to the second outer layer; and
an identification chip positioned in an opening of the first outer layer, wherein the identification chip is directly coupled to the corrugated core, and wherein a first dimension of one or more peaks in a subsection of the corrugated core directly coupled with the identification chip is different from a second dimension of one or more peaks in a remainder of the corrugated core.

2. The transaction card of claim 1, wherein the first outer layer is made from a first material and the corrugated core is made from a second material.

3. The transaction card of claim 2, wherein the first material is different than the second material.

4. The transaction card of claim 3, wherein the first material is a metal and wherein the second material is a plastic polymer.

5. The transaction card of claim 2, further comprising a magnetic stripe extending along the second outer layer of the body.

6. The transaction card of claim 1, wherein the body defines an outer perimeter including a first end opposite a second end, and a first side opposite a second side, and wherein the corrugated core extends between the first and second ends.

7. The transaction card of claim 6, wherein the corrugated core further extends between the first and second sides.

8. The transaction card of claim 1, wherein the first dimension and the second dimension comprises at least one from a group comprising a pitch and a length.

9. A contactless transaction card, comprising:
a body comprising a first outer layer opposite a second outer layer;
a corrugated core between the first outer layer and the second outer layer, wherein the corrugated core comprises a plurality of alternating peaks and valleys, wherein two or more peaks of the plurality of alternating peaks and valleys are directly coupled to the first outer layer, and wherein two or more valleys of the plurality of alternating peaks and valleys are directly coupled to the second outer layer, and wherein a first shape of a first set of one or more peaks in a predetermined area of the corrugated core is different from a second shape of a second set of one or more peaks in a remainder of the corrugated core; and
an identification chip positioned in a recess of the first outer layer, wherein the identification chip is coupled to the corrugated core in the predetermined area with the first set of one or more peaks with the first shape.

10. The contactless transaction card of claim 9, wherein the first outer layer is made from a first material and the corrugated core is made from a second material.

11. The contactless transaction card of claim 10, wherein the first material is a metal and wherein the second material is a plastic polymer.

12. The contactless transaction card of claim 9, further comprising a magnetic stripe extending along the second outer layer of the body.

13. The contactless transaction card of claim 9, wherein the body defines an outer perimeter including a first end opposite a second end, and a first side opposite a second side, and wherein the corrugated core extends between the first and second ends, and between the first and second sides.

14. The contactless transaction card of claim 9, wherein the first set of one or more peaks of the predetermined area of the corrugated core have a first pitch between two or more peaks of the first set and the second set of one or more peaks of the remainder of the corrugated core have a second pitch between two or more peaks of the second set.

15. The contactless transaction card of claim 9, wherein a width between two adjacent peaks varies across the plurality of alternating peaks of the corrugated core.

16. A transaction card, comprising:
a body comprising a first outer layer opposite a second outer layer; and
a corrugated core between the first outer layer and the second outer layer, wherein the corrugated core comprises a plurality of alternating peaks and valleys directly coupled to the first outer layer and to the second outer layer; and
an identification chip positioned in an opening of the first outer layer, wherein the identification chip is directly coupled to the corrugated core, and wherein a first dimension of one or more valleys in a subsection of the corrugated core directly coupled with the identification chip is different from a second dimension of one or more valleys in a remainder of the corrugated core.

17. The transaction card of claim 16, wherein the first outer layer is made from a metal and wherein the corrugated core is made from a plastic polymer.

18. The transaction card of claim 16, further comprising a magnetic stripe extending along the second outer layer of the body.

19. The transaction card of claim 16, wherein the body defines an outer perimeter including a first end opposite a second end, and a first side opposite a second side, and wherein the corrugated core extends between the first and second ends.

20. The transaction card of claim 16, wherein the first dimension and the second dimension comprises at least one from a group comprising a pitch and a length.

* * * * *